United States Patent [19]

Nesler et al.

[11] Patent Number: 4,770,200

[45] Date of Patent: Sep. 13, 1988

[54] PNEUMATIC INTERFACE APPARATUS

[75] Inventors: Clay G. Nesler, Milwaukee; Thomas O. Kautz, Waukesha, both of Wis.; Mark S. Bergman, La Crescent, Minn.

[73] Assignee: Johnson Service Company, Milwaukee, Wis.

[21] Appl. No.: 88,517

[22] Filed: Aug. 20, 1987

Related U.S. Application Data

[63] Continuation of Ser. No. 791,704, Oct. 28, 1985, abandoned.

[51] Int. Cl.[4] ............................................. G05D 16/00
[52] U.S. Cl. ........................................ 137/84; 137/85; 137/596.17
[58] Field of Search ................ 137/84, 85, 86, 596.17, 137/82

[56] References Cited

U.S. PATENT DOCUMENTS

| 2,775,982 | 1/1957 | Canfield | 137/625.64 |
| 2,800,913 | 7/1957 | Swartwout | 137/84 |
| 3,266,380 | 8/1966 | Eige | 137/85 |
| 3,394,722 | 7/1968 | Stranahar | 137/84 |
| 3,556,154 | 1/1957 | Kramer | 137/625.64 |
| 3,586,025 | 6/1971 | Blacklock | 137/82 |
| 3,598,138 | 8/1971 | Hadley | 137/82 |
| 3,774,464 | 11/1973 | Mindner | 137/625.64 |
| 3,874,407 | 4/1975 | Griswold | 137/596.17 |
| 4,207,914 | 6/1980 | Holloway | 137/85 |
| 4,261,509 | 4/1981 | Anders | 137/487.5 X |
| 4,440,066 | 4/1984 | Anderson | 91/459 |
| 4,576,194 | 3/1986 | Lucas | 137/84 |

FOREIGN PATENT DOCUMENTS

714719 9/1954 United Kingdom .

Primary Examiner—Alan Cohan
Attorney, Agent, or Firm—Alexander M. Gerasimow; Edward L. Levine

[57] ABSTRACT

The interface apparatus of the present invention includes a pneumatic flow control means for controlling the number of moles of a gas confined within a substantially constant volume of gas at a first pressure. A volume relay has a first chamber coupled to the control means by a pneumatic bus and a second chamber for coupling to a pneumatic transducer to be positionably controlled, the first chamber and the second chamber being in fluid flow isolation one from the other. The volume relay provides a second pressure at its second chamber which has a predetermined relationship to the first pressure. A substantially constant, confined volume is coupled to the flow control means and to the relay and the flow control means includes means for adjusting the rate of flow of gas from the substantially constant volume to a region of ambient pressure.

4 Claims, 5 Drawing Sheets

PNEUMATIC INTERFACE APPARATUS

This application is a continuation of application Ser. No. 791,704, filed 10/28/85 now abandoned.

BACKGROUND OF THE INVENTION

This application claims priority from pending U.S. patent application Ser. No. 644,148 filed Aug. 24, 1984, titled "Pneumatic Interface Apparatus for Control of Process Systems", the same being a continuation of application Ser. No. 386,408 filed on June 8, 1982 and now abandoned and from which priority is also claimed. The foregoing applications and this application are commonly assigned.

Pneumatic control of process systems is widely employed wherever the system installation requires rugged components, lowered cost, relative ease of installation and troubleshooting and a high degree of controllability. Examples of such processes which readily lend themselves to pneumatic control include the control of chiller and boiler temperature, steam or air line pressure control, flow control in fluid-transporting pipe systems, tank liquid level control, pH control in chemical processes, and heating, ventilating and air conditioning controls. Pneumatic control is frequently employed in petrochemical process systems where flammable fluids are often present and may be ignited by electrical control devices. For purposes of illustration, and not by way of limitation, the invention is shown and described in connection with a heating, ventilating and air conditioning system.

Heating, ventilating and air conditioning (HVAC) systems are frequently used in buildings to control the temperature of a conditioned space within the building and for energy management purposes. A type of HVAC system includes an air handling unit having a plurality of actuator-manipulated dampers for controlling the flow of outdoor air into the building, for controlling the flow of air exhausted from the building and for directing air which is heated or cooled and recirculated. Other mechanisms associated with air handling units typically include actuator-manipulated valves for controlling the flow of chilled or heated water through heat exchanger coils disposed in the ductwork for controlling the temperature of air flowing therethrough.

One type of actuator used with such air handling units comprises a spring biased, pneumatic cylinder having its rod coupled to a damper or valve. The cylinder is connected to a source of pneumatic pressure such as a pneumatic bus network formed of small diameter flexible polyeythlene tubing and installed throughout the building. Control is by the solution of known algorithms within a pneumatic controller and the generation of analog pneumatic output signals directed to the cylinders.

The relatively recent advent of computerized direct digital control apparatus and the desire of building owners to incorporate such computerized apparatus into new or existing HVAC systems employing low cost, rugged pneumatic actuators requires that a digital-to-pneumatic interface system be employed for receiving digital signals from the control apparatus and translating them to pneumatic signals for cylinder or other actuator positioning. These direct digital controllers may be constructed and arranged to repetitively solve any one or more of several known control algorithms for generating command signals to the interface system and for reasons unrelated to the invention, it is often preferable to arrange the digital controller to provide command signals which direct the cylinder to undergo a computed change in cylinder pressure rather than to move to a new position as represented by a new absolute pressure. Stated another way, it is often preferable to arrange the digital controller and the attached system in a manner such that the new position to be assumed by a cylinder is a function of the duration of the digital output signal of the controller rather than a function of the change in cylinder pressure. In commonly employed pneumatic control systems, it may also be desirable to cause particular cylinders within the system to exhibit full stroke over pressure ranges which may differ from cylinder to cylinder and commonly employed full stroke pressure ranges are 3-8 psig, 8-13 psig and 13-18 psig.

An example of an interface system useful for controlling the position of a single actuator or for the simultaneous control of the position of several actuators of the same size, full stroke pressure range and loading is shown in U.S. Letters Pat. No. 4,261,509. This system includes a pair of two position, electrically actuated solenoid valves for receiving digital signals and controlling the flow of fluid into and out of the actuator. Pneumatic resistors, sometimes termed restrictors, having orifices therethrough typically of a few thousandths of an inch in diameter are disposed in the pneumatic lines for controlling actuator stroke distance per unit time, i.e., for controlling the slopes of the actuator pressure-time graphs representative of actuator stroke characteristics in both directions of travel.

Another example of an interface device is shown in U.S. Letters Pat. No. 4,440,066 and includes a pair of solenoid valves for controlling the flow of air from a pressure source to a region of indeterminate volume and from the region to an area of ambient pressure. An adjustable flow orifice is provided for controlling the flow rate to and from an attached actuator, e.g., a cylinder. U.S. Letters Pat. No. 3,266,380 shows the use of a reservoir as an integrating capacitance in a pneumatic computing device, unsuitable for interfaced control, which contemplates variable input pressures and which, like the apparatus of the aforementioned U.S. Pat. No. 4,440,066, includes a feedback (closed loop) feature.

While interface systems of the aforementioned type have heretofore been satisfactory for the positioning of actuators, they are nevertheless characterized by certain disadvantages. For example, when restrictors are used to control the stroking characteristics of a single actuator or of a group of actuators having the same size, spring range and loading, the restrictor orifice sizes must be selected by experimentation at the installation site. This is so since actuator stroke times are dependent upon actuator size, spring range, loading and the volume of fluid contained within the actuator and the pneumatic interconnections. These parameters are frequently difficult or impossible to determine prior to actual installation. If the HVAC system requires actuator sequencing and incorporates actuators having different volumetric sizes, spring ranges and/or loadings, the system will exhibit highly nonlinear gain characteristics and the control problem is thereby further complicated. Using the interface system of the aforementioned U.S. Pat. No. 4,261,509 as illustrative, and assuming a plurality of parallel connected dissimilarly-configured actuators to be controlled, the percent change of position will be different for each actuator for a given time during which a solenoid is energized for introducing fluid to or expelling fluid from the actuators. This results from the fact that a change in the contained volume of fluid of one actuator will affect the stroke distance per unit time of other actuators in accordance with the equation of state of an ideal gas. If restrictors are selected to control the stroke time of, for example, a small, lightly loaded actuator, the system response will be unacceptably sluggish for positioning larger or more heavily loaded actuators. Conversely, if restrictors are selected for the proper control of actuators of the latter type, system instabilities may result. Even with the addition of a device called a pilot positioner to some or all of the actuators, restrictor selection must be by field experimentation or by measurement and computation of the volume of compressed fluid contained within the pneumatic interconnections and the pilot positioner pressure chambers. A further disadvantage of systems of the aforementioned type is that they are susceptible to significant leaks of pneumatic fluid. For example, each pneumatic connection of ¼ inch tubing typically has a leak rate of approximately 0.1 standard cubic inches per minute (SCIM) at 20 psig while a typical pilot positioner has a leak rate of 0.3 SCIM. In a system including a constant volume reservoir where the system contains a relatively small volume of fluid and/or a large number of connection points and pilot positioners, changes in the control pressure due to leaks within the system and over the time interval between parameter sample times, e.g., conditioned-space temperature sampling times, would be unacceptably large.

Accordingly, an interface system which permits preselection of restrictor orifice sizes irrespective of the configuration of the related pneumatic bus and actuators, which may be used to control actuators having a wide variety of contained fluid volumes and which may have an adjustment feature permitting its use with actuators which may operate over any one of several pressure ranges would be a significant advance over the prior art.

SUMMARY OF THE INVENTION

In general, the interface apparatus of the present invention includes a pneumatic flow control means for controlling the number of moles of a gas confined within a substantially constant volume of gas at a first pressure. A volume relay has a first chamber coupled to the control means by the confined volume of gas and a second chamber for coupling to a pneumatic actuator to be positionably controlled, the first chamber and the second chamber being in fluid flow isolation one from the other. The volume relay provides a second pressure at its second chamber which has a predetermined relationship to the first pressure. Means having a substantially constant, confined volume are interposed between the flow control means and the relay and cooperates with the flow control means for determining the slopes of the actuator pressure-time graphs. The flow control means may include means for adjusting the rate of flow of the gas from the substantially constant volume to a region of ambient pressure.

It is an object of the invention to provide a new and improved interface apparatus for positioning pneumatic actuators which overcomes disadvantages of the prior art.

Another object of the invention is to provide an interface apparatus which permits the preselection of flow controlling restrictors.

Yet another object of the invention is to provide an interface apparatus which provides actuator positioning characteristics that are independent of the size or number of actuators connected thereto.

Still another object of the present invention is to provide an interface apparatus which may include means for field adjustment of the rate of flow of a gas from a substantially constant confined volume to a region of ambient pressure.

Another object of the present invention is to provide an interface apparatus which is useful with direct digital controllers.

Yet another object of the present invention is to provide an interface apparatus which results in movement of an actuating cylinder to a new position which is a computed function of the duration of a digital signal from a direct digital controller. How these and other objects of the invention are accomplished will become more apparent from the detailed description thereof taken with the accompanying drawing.

DESCRIPTION OF THE PREFERRED EMBODIMENTS

Understanding of the invention will be aided by an explanation of the relevant gas law and from the field of applied physics, the equation of state of an ideal gas is expressed as:

$$pV = nRT$$

where
- $p$ = pressure of a gas in a substantially rigid, confining volume or vessel;
- $V$ = the confined volume of the vessel;

n=the number of moles of gas within the vessel;
R=the universal gas constant, and;
T=the temperature of the gas in °K.

From the equation, it will be apparent that if the temperature of the gas confined in the vessel is held constant, a reasonable assumption for this analysis, and if the volume of the vessel remains unchanged, the pressure of the gas will have a direct relationship to the number of moles of the gas confined within the vessel.

Figure 1:
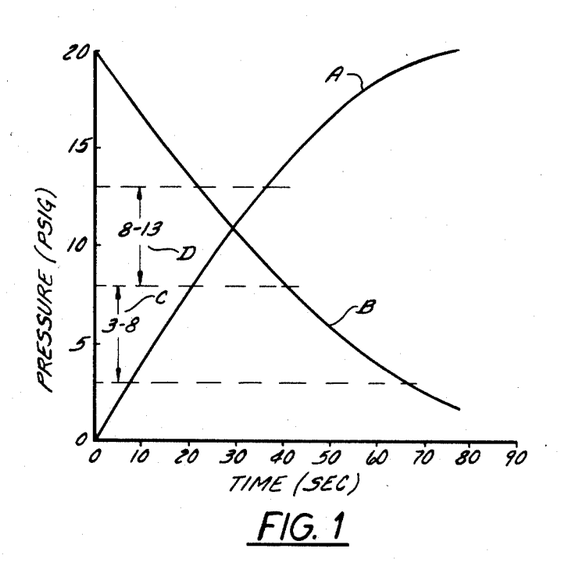
FIG. 1 is a graphical depiction of described rise and decay characteristics of the pressure within a substantially constant confined volume of a gas.

Understanding of the invention will also be aided by referral to the graph of FIG. 1 which depicts the rise and decay characteristics of the gas pressure prevailing within a substantially constant, confined volume of gas. Curve A represents the pressure rise characteristic over time when a gas is introduced into the confined volume from a source of constant pressure, e.g., 20 psig and through a particular flow-restricting orifice. The initial pressure in the volume is assumed to be 0 psig. Curve B represents the pressure decay characteristic over time when the pressurized gas within the volume is permitted to be expelled from the volume to an area of ambient pressure, e.g., an area at 0 psig, expulsion being through a particularly sized flow-restricting orifice. Control of gas flow into and out of the volume may be by a pair of normally closed, two position solenoid valves.

Since curves A and B are both nonlinear, it is apparent that if one desires to operate a cylinder over, for example, the range C of 3-8 psig, that generally linear portion of curve A which falls within the range C has a slope which is dramatically different from the slightly arcuate portion of curve B which falls within range C when ignoring the algebraic sign of the slopes. Therefore, with a cylinder pressure within range C and rising along curve A, the magnitude of the change in pressure per unit time is different from that of a declining cylinder pressure along curve B are within range C. This may present an unacceptable result if the cylinder is desired to be operated by signals from a digital controller where cylinder positioning is preferably by a computed signal duration rather than by measuring changes in pressure or by other means.

On the other hand, the slopes of curves A and B in the range D of 8-13 psig are substantially equal one to the other if algebraic sign is ignored and this demonstrates that the particular orifice used in the system on which the curves are based would likely be satisfactory for cylinder operation over the range of 8-13 psig with a digital controller.

Figure 2:
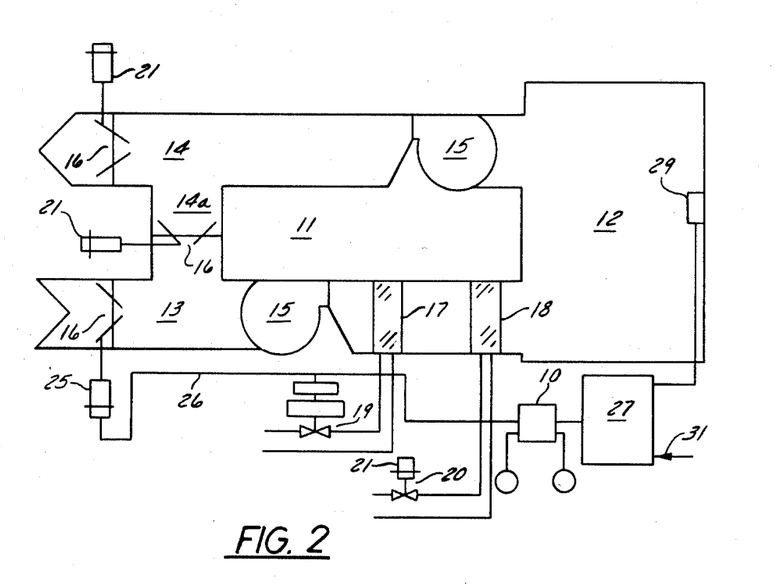
FIG. 2 is a simplified schematic diagram showing the interface apparatus of the present invention in conjunction with an exemplary process control system comprising an air handling unit.

Referring next to FIG. 2, the interface apparatus 10 of the present invention is shown in connection with an exemplary process control system comprising an air handling unit 11 arranged in fluid flow communication with a space 12 to be conditioned. The air handling unit 11 includes an inlet duct 13 for introducing outdoor ambient air to the space 12, an exhaust duct 14 for removing air therefrom and a cross connected return duct 14a coupled between the inlet duct 13 and the exhaust duct 14. Fans 15 are provided for forced air movement. Each duct 13, 14, 14a includes a movable damper 16 disposed therein for controlling the flow of air therethrough. The inlet duct 13 also includes an air cooling coil 17 having chilled water passing therethrough and an air heating coil 18 having hot water or steam passing therethrough, the coils 17, 18 being provided for controlling the temperature of air being introduced into the space 12. A chilled water valve 19 and a hot water valve 20 are coupled to the cooling coil 17 and heating coil 18 respectively for modulating the flow of liquid through the coils. The air handling unit 11 also includes pneumatic transducers for converting signals to another energy state as, for example, from pneumatic to an electrical or mechanical signal. By way of illustration, such transducers may include a plurality of pneumatic actuators or cylinders 21, each actuator being mechanically coupled to its associated damper 16 or valve 20 for controllable positioning thereof. The transducers 21 may be coupled to a pneumatic bus (not shown) which provides a controlled pneumatic pressure for positioning the actuators 21 and the associated dampers 16 and valve 20. A direct digital system controller 27 is coupled to a parameter signalling device such as a thermostat 29 for receiving signals therefrom. The system controller 27 periodically samples a system parameter, e.g., the space temperature as signalled by the thermostat 29, compares it with the temperature set point introduced and established within its computer data base as symbolically represented by the arrow 31, digitally solves a control algorithm and generates digital electronic command signals for controlling a transducer position. For purposes of illustration, the invention will be described in connection with a pneumatic cylinder 25 connected to the apparatus 10 by a pneumatic bus 26 and it is to be appreciated that temperature is only one of several possible process system parameters, the control of which will be facilitated with the inventive interface apparatus 10 and that the latter is useful in systems for controlling processes wherever pneumatic transducers are employed for parameter control.

Figure 3:
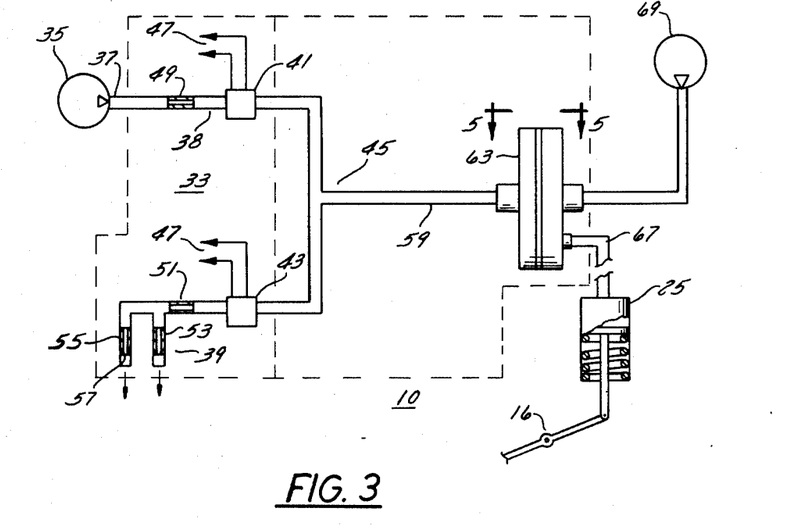
FIG. 3 is a pictorial schematic diagram of a first embodiment of the interface apparatus shown in FIG. 2 with portions shown in cross-section and other portions shown in full representation.

Referring next to FIGS. 2 and 3, a first embodiment of the interface apparatus 10 is connected to an exemplary pneumatic transducer comprising the spring biased, pneumatically positioned cylinder 25 coupled to a pivotable air damper 16 for positioning control thereof. The apparatus 10 includes a pneumatic flow control means 33 which may be coupled to a first source 35 of compressed fluid such as an air compressor set to a regulated pressure and coupled to the first end 37 of a pneumatic bus 38, the second end 39 of which is open for free fluid exhaustion to atmosphere. While the regulated pressure may be selected in view of the ratings of the various components coupled thereto, a source pressure of about 20 sig is common for process control of HVAC systems. A pair of normally closed, electrically actuated solenoid valves including a first input valve 41 and a second exhaust valve 43 are arranged in series for controlling the flow of pressurized fluid to and from the substantially constant, confined volume or vessel 45 connected therebetween. The actuating solenoids of the first valve 41 and the second valve 43 each have their electrical conductors 47 coupled to the system controller 27 for receiving command signals therefrom. The pneumatic flow control means 33 also includes a plurality of restrictors including a first restrictor 49 disposed in the bus adjacent the first valve 41 and second, third and fourth restrictors 51, 53, 55 respectively, disposed in the end 39 adjacent the second valve 43. Each restrictor 49, 51, 53, 55 has a longitudinal passage or orifice 57 therethrough for controlling the rate of flow of compressed gas to or from the confined volume 45. Upon actuation of the first valve 41, the first restrictor 49 will permit fluid to restrictively flow from the source 35 to the confined volume 45 while actuation of the second valve 43 will permit fluid to be exhausted from the confined volume 45 through the second restrictor 51, through the third and/or fourth restrictors 53, 55 and thence to atmosphere. The restrictors 53 and 55 may be selected to have fixed orifice sizes which are substantially identical or which differ from one another so as to provide the desired flexibility in application. The restrictors 53 and 55 may be replaced by a vernier adjustable restrictor downstream from the solenoid valve 43 but this arrangement would likely require shop or field calibration, a possibly costly procedure. Restrictors 53, 55 having fixed orifice sizes may be permanently installed or may be of the removable, insertable plug type. In another alternative, the apparatus 10 may also be embodied so that the second end 39 includes only a single exhaust port (not shown) having a single restrictor, e.g., restrictor 53 fixed therewithin.

Selective actuation of the first valve 41 or the second valve 43 thereby facilitates the regulation of a first pressure within the confined volume 45. When neither valve 41, 43 is actuated, the pressure in the volume 45 remains substantially constant for reasons set out in greater detail below. It should be appreciated that the interface apparatus 10 will work equally well, irrespective of whether a restrictor 49, 51 is disposed in the bus 38 on the upstream or the downstream side of its associated valve 41, 43 and the restrictor locations depicted are merely for illustration.

Figure 5:
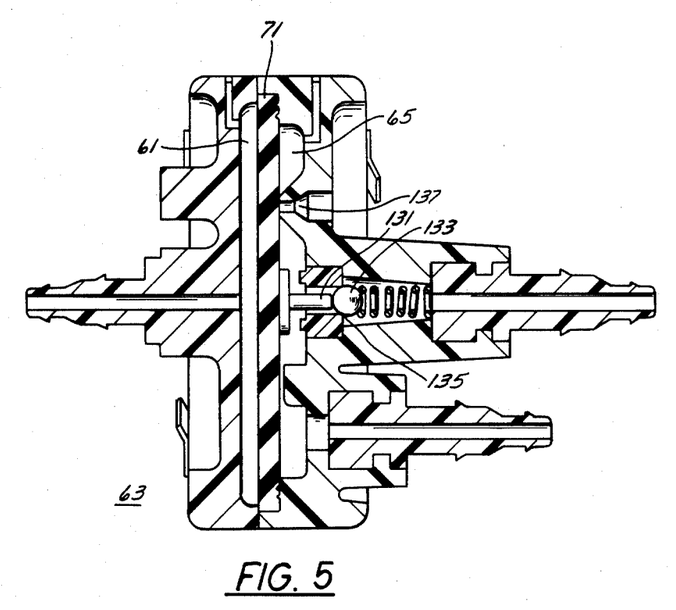
FIG. 5 is a cross-sectional view of the volume relay portion of the interface apparatus taken in the plane 5—5 of FIG. 3 and with portions shown in full representation.

Referring to FIGS. 3 and 5, the pneumatic flow control means 33 is coupled by a pneumatic bus 59 to the first input chamber 61 of a volume relay 63, the second output chamber 65 of which is coupled by an output bus 67 to one or more transducers to be positioned such as transducer 25. A second source 69 of compressed gas at a substantially constant pressure, e.g., 20 psig, is attached to the second chamber 65 as a pneumatic driver for the transducer 25. The volume relay 63 includes a resilient diaphragm 71 disposed intermediate the first chamber 61 and the second chamber 65 for maintaining the chambers 61, 65 in fluid flow isolation one from the other. The volume relay 63 is constructed and arranged such that the pressure in the second output chamber 65, and therefore in the output bus 67 and the transducer 25, will have a predetermined relationship to the pressure in the first input chamber 61, irrespective of changes in the latter.

The volume relay 63 is preferably constructed and arranged such that the pressure in the output chamber 65 is maintained at a predetermined relationship to that of the input chamber 61. For reasons of simplicity of relay construction and ease of installation, testing and troubleshooting, it is preferred that this relationship be linear and in the ratio of 1:1. It should also be noted that while the flexure of diaphragm 71 will result in slight momentary changes in the volume of gas defined by the first chamber 61, such changes are quite small and will have no significant effect upon the performance of the interface apparatus 10. It should be appreciated that in the first embodiment of FIG. 3, the confined volume 45 is that which is enclosed by the first chamber 61 of the volume relay 63 and that portion of the buses 38, 59 which is to the right of the solenoid valves 41, 43 as viewed in FIG. 3. Other details of one type of volume relay 63 useful in the present invention are shown and described in U.S. Letters Pat. No. 4,207,914 which is incorporated herein by reference.

Figure 4:
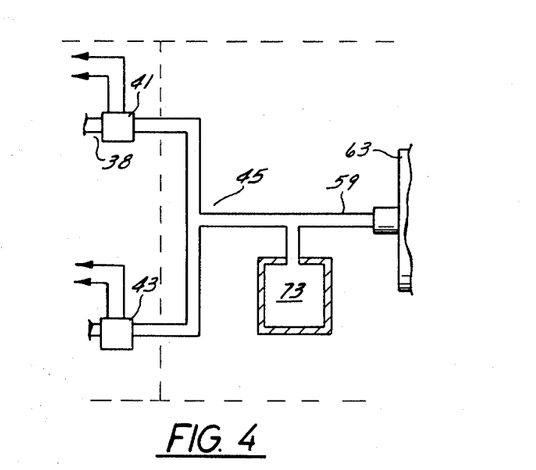
FIG. 4 is a pictorial schematic diagram of a second embodiment of the interface apparatus of FIG. 2 with parts broken away, portions shown in cross-section and other portions shown in full representation.

A second embodiment of the interface apparatus 10 is partially shown in FIG. 4 and differs from the first embodiment only in that a reservoir 73 is connected in fluid flow communication with the bus 59. Volumetric sizing of the confined volume 45, the "V" component of the ideal gas equation, may be embodied as the aggregate confined volume 45 as described in the first embodiment or, as shown in FIG. 4, the aggregate volume 45 may additionally include that confined by the reservoir 73 coupled in parallel with the bus as shown or in series therewith.

It should be understood that the interface apparatus 10 may be readily configured using available tubing, connector, restrictor, valve and volume relay components. However, where higher production quantities warrant, the components may be packaged into a single structure having fluid-conductive passages and a confined volume 45 etched or otherwise formed therewithin. While tooling and design investment will necessarily be increased with this latter approach, assembly costs will be materially lowered.

When selecting the volumetric size of the confined volume 45, it is preferred that consideration be given to several design parameters selected in view of the aforementioned equation of state of an ideal gas. One such parameter is the magnitude of the operative volume of compressed gas defined within that portion of the interface apparatus 10 and which is maintained substantially constant. The operative volume is that total volume 45 of compressed gas confined as described in the first embodiment, confined within any reservoir 73 employed and within the first chamber 61 taken together with the volume of any parasitic gas. Parasitic gas is that which resides in those portions of the flow control means 33 between a restrictor 49 or 51 and its associated solenoid valve, 41 or 43, respectively. If the valves 41, 43 are constructed with resistors incorporated therein, this parasitic volume may be practically eliminated. Another design parameter to be considered is that each of the orifices 57 in the restrictors 49, 51, 53, 55 will have a practical minimum diameter, typically on the order of 0.005 inch, in order to avoid orifice plugging by small particles entrained in the gas and in order to permit manufacture of the restrictors 49, 51, 53, 55 by conventional techniques at low cost. Yet another parameter to be recognized is the leakage rate, if any, of the illustrated pneumatic connection points. This leakage rate may be reduced to a very low value or eliminated entirely by potting the interface apparatus 10 with a gas-impervious compound after assembly. Still another parameter to be recognized is the desired slopes of the curves A, B which will result upon actuation of either of the valves 41, 43.

In the case of an interface apparatus 10 having connection points characterized by small but detectable leaks, the minimum size of the confined volume 45 should preferably be that which will result in a pressure change in the gas contained within the confined volume 45 of less than about 1% over the maximum time interval during which the apparatus 10 will be maintained in a quiescent state when neither the valve 41 nor the valve 43 is actuated. This will normally be the maximum time interval between those consecutive times when the system controller 27 will sample a parameter, e.g., a temperature signal, and generate corrective commands. For optimum cylinder positioning accuracy over extended periods of operation, it is preferred that this pressure change be limited to one-half of 1% or less. If the interface apparatus 10 is potted to eliminate connection leaks altogether, the controlling parameter for the selection of the minimum cubic containment of the confined volume 45 becomes the desired maximum slopes of the curves A, B computed in view of the aforementioned equation and in view of the minimum orifice sizes available or desirable to be used. It is also to be appreciated that one of the aspects of the apparatus 10 is an adjustment feature which permits one to select a slope for a particular portion of curve A which coincides with the slope of a portion of curve B, ignoring algebraic sign.

In one embodiment of the invention, short lengths of tubing having an internal diameter of 0.0625 inches and a total confined volume of about 0.08 cubic inches were used to connect the solenoid valves 41, 43, a volume relay 63 having a first chamber volume of about 0.13 cubic inches and a reservoir 73, all as configured in accordance with FIG. 4. Further, the parasitic volumes of compressed gas totaled approximately 0.006 cubic inches. For a first pressure source 35 regulated to a pressure of 20 psig, a first restrictor 49 orifice adjusted to a computed diameter of 0.00422 inches and a second restrictor 51 orifice adjusted to a computed diameter of 0.00485 inches, the cubic confinement of the volume was selected to be 2.4 cubic inches and provided highly acceptable system accuracy for temperature sampling times spaced approximately three minutes apart.

Figure 6:
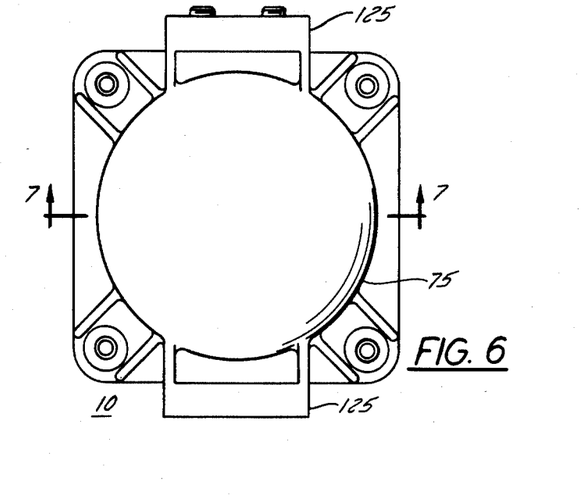
FIG. 6 is a top plan view of a commercial embodiment of the inventive apparatus.
Figure 7:
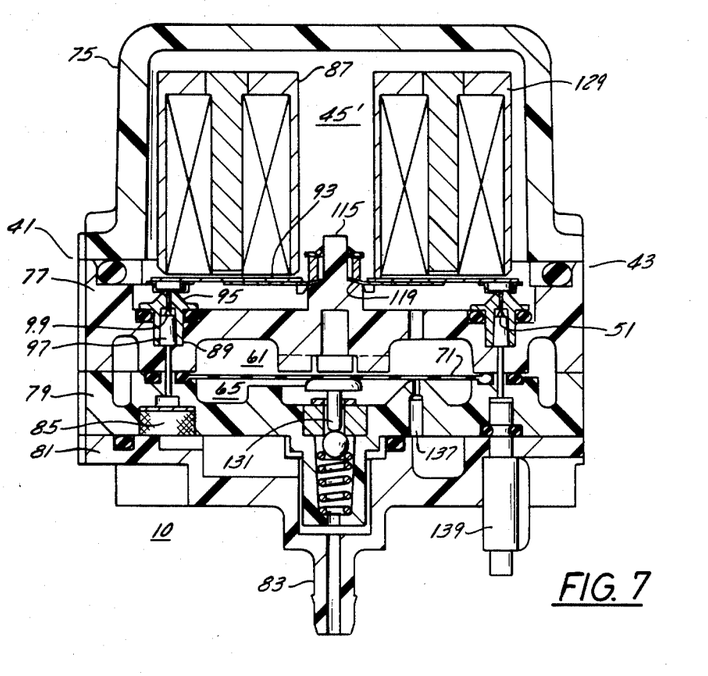
FIG. 7 is a side elevation view of the apparatus of FIG. 6 taken along the plane 7—7 thereof with portions shown in cross-section and other portions shown in full representation.
Figure 8:
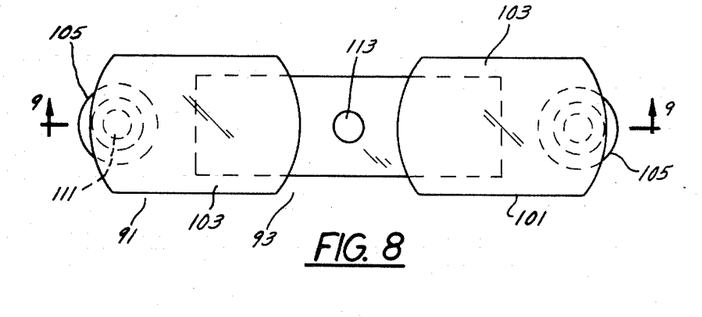
FIG. 8 is a top plan view of the flexure lever of the apparatus of FIG. 7.
Figure 9:
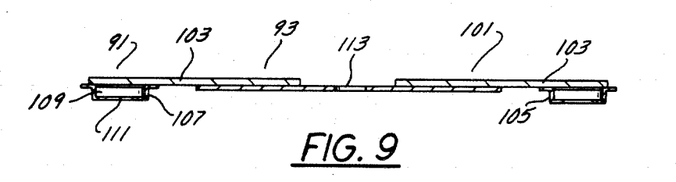
FIG. 9 is a side elevation view of the lever of FIG. 8 taken along the plane 9—9 thereof.

Referring next to FIGS. 3, 5, 6 and 7, a commercial embodiment of the apparatus 10 is shown to include a generally cylindrical cover 75, an upper body 77, a center plate 79 and a lower body 81. The bodies 77, 81, the plate 79 and the other parts disposed therewithin are cooperatively formed to function in the manner of the volume relay 63 shown in FIG. 5. A central barbed connection 83 is provided for the connection of a source of air 69 at a substantially constant pressure (FIG. 3) while a radially disposed connector (not shown) is provided for connecting to output bus 67 and the cylinder 25 of FIG. 3. The plate 79 and body 81 are internally configured so that source 69 is also permitted to function as the source 35 of FIG. 3, the supply to the first input valve being through a small filter 85. The first input valve 41 and the second exhaust valve 43 are similarly constructed and only the first input valve 41 will be described in detail. Referring additionally to FIGS. 8 and 9, the first input valve 41 includes a supply solenoid 87, a control nozzle 89 and an extension 91 of a flexure lever 93 which is disposed intermediate the solenoid 87 and the nozzle 89 for controllably flowing air through the latter. The control nozzle 89 includes an upper truncated cone section 95 and has a longitudinal passage 97 therethrough which is fitted with a control orifice 99. In the preferred embodiment and unlike the more common plastic orifices 49, 51, 53, 55 having the aforedescribed typical minimum opening therethrough, the orifice 99 is formed of sapphire and has an aperture nominally of 0.003" therethrough. By using an orifice of this type, through which air may flow relatively slowly, the physical size of the substantially constant volume 45 may be reduced.

Figure 10:
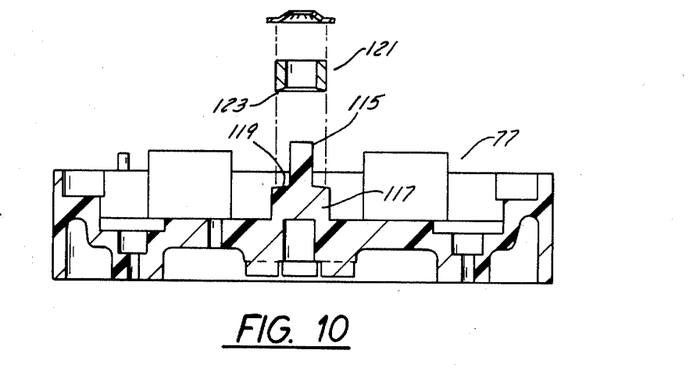
FIG. 10 is a cross-section, side elevation view of the center plate of the apparatus with parts added in exploded view.

Referring particularly to FIGS. 8, 9 and 10, a flexure lever 93 is shown to include a first extension 91 and a second extension 101, each extension 91, 101 being slightly upwardly movable when its associated solenoid is energized. Each extension 91, 101 includes a ferrous armature member 103 and a lower valving button 105. In a preferred embodiment, the button 105 is embodied as a generally cylindrical cannister 107 for confining a resilient valving material 109, the cannister 107 having a lower opening 111 therethrough for permitting the material 109 to come in direct contact with the cone section 95. The lever 93 includes a central aperture 113 for receiving the mounting post extension 115 of the upper body 77. Referring particularly to FIG. 10, it is preferred that the mounting post 117 and its extension 115 define a shoulder 119 therebetween having an angularly sloping surface, a preferred angle to be nominally 4°. A preferred clamp block 121 has an inside diameter sufficiently in excess of that of the outside diameter of the extension 115 so as to freely fit therewith and define a small annular space therebetween. The outer perimeter of the clamp block 121 defines a rectangle leaving a dimension between opposing sides which is preferably slightly less than the diameter of the post 117 while the lower lip 123 of the clamp block 121 is chamfered at an angle, slightly in excess of that of the shoulder 119, nominally 10°. When formed in that manner, there will be two edges of contact between the lip 123 of the clamp block 121 and the lever 93 and a slight downward force will thereby be exerted upon the extensions 91, 101, thereby maintaining the valves 41, 43 closed in the absence of solenoid energization. A thin spacer shim (not shown) may be interposed at assembly between each solenoid, as solenoid 87, and its associated extension 91 so as to provide a slight air gap to result in a clean closure of the valves, as valve 41, when the solenoid 87 is de-energized. The shim is thereupon removed.

Referring again to FIGS. 3, 4 and 7, in a preferred embodiment, the substantially constant volume 45 of air may be that volume 45' which is confined between the upper body 77 and the cover 75. Provision of the volume 45' in this manner avoids the necessity of including a separate air reservoir 73 and results in certain manufacturing and size economies. As shown in FIG. 6, the apparatus 10 may be conveniently constructed to include a pair of mounting ears 125 sized and located to engage the lips of a snap-in mounting track (not shown) for ease of mounting and serviceability.

Figure 11:
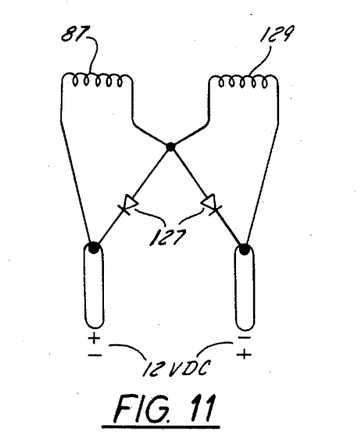
FIG. 11 is an electrical schematic diagram of the apparatus.

Referring next to FIGS. 2 and 11, the electrical circuitry of the preferred apparatus 10 may be arranged with diodes 127 as shown so that either the supply solenoid 87 or the exhaust solenoid 129 may be energized from a direct digital controller 27 using DC signals of reversing polarity.

Referring to the FIGURES and in operation, the digital system controller 27 samples a signal representing a parameter to be controlled such as the signal from the thermostat 29 representing actual space temperature, compares it with the desired data base temperature set point, solves a predetermined algorithm and generates a digital command signal for actuating either the first valve 41 or the second valve 43. Upon opening the first valve 41, compressed gas will flow from the source 35 or 69, depending upon the embodiment, through the first restrictor 49 or orifice 99 and the pressure within the confined volume 45 or 45' will rise at a rate per unit time determined by the parameters selected as described above. The pressure in the first chamber 61 will thereby be made to exceed that in the second chamber 65 and the diaphragm 71 is caused to flex rightwardly as seen in FIG. 5. The plunger end portion 131 bearing against the check ball 133 will cause a movement of the ball 133 away from sealing edge 135 and a consequent opening of the check valve, the area of the opening being generally proportional to the degree of diaphragm flexure. Compressed gas from the source 69 will thereby be permitted to flow through the check valve to the second chamber 65, the output bus 67 and the transducer 25 until the pressure in the second chamber 65 comes to that value indicated by the design ratio of the relay 63, typically 1:1. The diaphragm 71 then returns to position equilibrium and the check ball 133 is returned to sealing engagement with the edge 135. Any leakage of compressed gas from the connections of the output bus 67 will be sensed by the volume relay 63 which will function as described above to maintain pressure equilibrium.

Similarly, as the second valve 43 is actuated, compressed gas in the confined volume, 45, 45' will be controllably exhausted through the second restrictor 51 and through one or more restrictors 53, 55 or as further described below, to atmospheric ambient. The pressure in the interface apparatus 10 will therefore decline at a predetermined rate and the resulting difference in pressure between the second chamber 65 and the first chamber 61 will result in flexure of the diaphragm 71 to the left as viewed in FIG. 5. Diaphragm movement will permit the passage 137 to be opened and compressed gas in the second chamber 65, the output bus 67 and the transducer 25 to be controllably exhausted to again bring the pressures of the first chamber 61 and the second chamber 65 into ratio equilibrium, whereupon the diaphragm 71 again moves to close passage 137.

It will be appreciated from the foregoing that in the embodiments of the apparatus 10 as shown in FIGS. 3 and 4, the size of the orifices 57 in the restrictors 53, 55 and the magnitude of the confined volume 45 may be predetermined. Therefore, one may select restrictors 53 and/or 55 to have orifice sizes which will equalize the unsigned slopes of those portions of curves A and B over which it is desired to operate a particular cylinder or group of cylinders, e.g., the 3–8 psig portions. If either of the restrictors 53 or 55 is unused, it may simply be capped. In the embodiment of FIG. 7, the matter of selecting exhaust restrictors is preferably accomplished by providing an insertable, removable restrictor 139 which is sized to slidably fit into the lower body in sealing engagement therewith. Since the aggregate volume of air confined in volume 45' and chamber 61 may be predetermined at the time of design, and manufacture, the apparatus 10 may be supplied with a plurality of restrictors 139, preferably three for a typical HVAC application, each having an orifice of a different cross-sectional area to result in curves A, B which have substantially equal slopes for the pressure range, e.g., 3–8 psig, 8–13 psig or 13–18 psig, over which cylinder 25 is desired to be operated.

The minimum volumetric fluid delivery capacity of the sources 35 and/or 69 and the gas flow rate capacity of the relay 63 may be determined in a known manner and in a preferred embodiment, those delivery and flow rate capacities are selected such that the pressure in the second chamber 65 and the output bus 67 coincides with that of the first chamber 61 with no appreciable time delay therebetween. Further and in the case of the embodiments of FIGS. 3 and 4, it is preferred that the regulated pressure of the second source 69 closely matched to that of the first source 35.

It is to be appreciated that the interface apparatus 10 will, when constructed in accordance with the teaching of the specification, provide an output pressure to the cylinder transducer 25 which is a function of the duration of the signal applied to one of the valves 41, 43 by the controller 27 and that this result is accomplished without the use of feedback control. Therefore, cylinder pressure will be unaffected by the length of bus 67 used to connect the transducer 25 to the volume relay 63 or by the functioning of the transducer 25 itself which changes in contained volume over its stroke length. By the selective use of restrictors 53 and/or 55 or by selecting an appropriate restrictor 139 in the embodiment of FIG. 7, the slope of the operating portions of the curves may also be tailored for the application.

While only a few embodiments of the invention have been illustrated and described, it is not intended to be limited thereby but only by the scope of the appended claims.

We claim:

1. A pneumatic interface apparatus for receiving digital input control signals and controlling the position of a pneumatic transducer in response to said signals, the apparatus including:

a first solenoid valve to be energized for controlling the flow of a gas from a single source of pressurized gas to a first region confining a substantially constant volume of gas, said source being maintained at a substantially constant pressure;

a second solenoid valve to be energized for controlling the flow of gas from said first region to a second region at atmospheric pressure;

a volume relay having a first chamber coupled to said first valve and to said second valve by a pneumatic bus and a second chamber for coupling to a pneumatic transducer to be positionably controlled by a pneumatic analog output signal of said relay, said first chamber and said second chamber being in fluid flow isolation from one the other, said relay providing a second pressure at said second chamber which has a predetermined relationship to said first pressure;

a first pneumatic restrictor interposed between said first region and said second region for controlling the rate of pressure decrease in said first region during those times when said second valve is energized;

wherein said first restrictor is readily removable from said apparatus and is replaceable by a second restrictor having an orifice flow passage therethrough of a cross-sectional area different from that of the orifice flow passage of said first restrictor.

2. A pneumatic interface apparatus for converting digital electrical input signals to a pneumatic output signal in a heating, ventilating and air conditioning system and including:

pneumatic input means adapted to be connected to a single first source of compressed gas at a substantially constant pressure and including normally closed first and second solenoid valves for receiving pulsed electrical input signals from a direct digital system controller, said first valve being energizable for flowing compressed gas from said first source to a region defining a substantially constant volume of gas, said second valve being energizable for flowing gas from said region to an area of ambient pressure;

a pressure repeater for providing an analog output pressure in response to said digital input signals and including a first chamber coupled to said input means and a second chamber to be coupled to a pneumatic transducer to be positionally controlled;

a reservoir coupled between said input means and said repeater for controlling the rate of change of said analog output pressure signal, said analog output pressure signal having a magnitude which is a function of the duration of energization of one of said solenoid valves;

a first pneumatic restrictor interposed between said reservoir and said area of ambient pressure for controlling the rate of pressure decrease in said reservoir during those times when said second valve is energized;

said apparatus thereby being operable by said digital system controller to positionably control said transducer;

wherein said first restrictor is readily removable from said apparatus and is replaceable by a second restrictor having an orifice flow passage therethrough of a cross-sectional area different from that of the orifice flow passage of said first restrictor.

3. A pneumatic interface apparatus for the positioning control of at least one pneumatic transducer and comprising:

a pneumatic flow control means having a first input valve, a second exhaust valve and a restrictor associated with each valve for controlling the number of moles of a gas confined within a substantially constant volume of gas;

a volume relay having a first chamber connected to said control means and a second chamber connectable to said transducer, said chambers being isolated from each other by a diaphragm, the pressure in said second chamber being maintained by a pressure source and a check valve to be in a predetermined relationship to the pressure in said first chamber;

said apparatus including a cover and a body disposed adjacent said cover, said cover and said body cooperating to define said substantially constant volume;

said first valve and said second valve being disposed in said body;

a first restrictor removably disposed in said apparatus to be in fluid flow communication between said substantially constant volume and a region of atmospheric pressure for controlling the rate of pressure decrease in said constant volume during those times when said second valve is energized.

4. The invention set forth in claim 3 wherein said first restrictor is readily removable from said apparatus and is replaceable by a second restrictor having an orifice flow passage therethrough of a cross-sectional area different from that of the orifice flow passage of said first restrictor.

* * * * *